US009657971B2

(12) United States Patent
Hu et al.

(10) Patent No.: US 9,657,971 B2
(45) Date of Patent: May 23, 2017

(54) FIRST-ORDER PHASE-TRANSITION LA(FE,SI)$_{13}$-BASED MAGNETOCALORIC MATERIAL SHOWING SMALL HYSTERESIS LOSS AND PREPARATION AND USE THEREOF

(71) Applicants: Institute of Physics, Chinese Academy of Sciences, Beijing (CN); Hubei Quanyang Magnetic Materials Manufacturing Co., Ltd, Yichang, Hubei (CN)

(72) Inventors: Fengxia Hu, Beijing (CN); Ling Chen, Beijing (CN); Jing Wang, Beijing (CN); Lifu Bao, Beijing (CN); Rongrong Wu, Beijing (CN); Baogen Shen, Beijing (CN); Jirong Sun, Beijing (CN); Huayang Gong, Yichang (CN)

(73) Assignees: INSTITUTE OF PHYSICS, CHINESE ACADEMY OF SCIENCES, Beijing (CN); HUBEI QUANYANG MAGNETIC MATERIALS MANUFACTURING CO., LTD., Hubei (CN)

( * ) Notice: Subject to any disclaimer, the term of this patent is extended or adjusted under 35 U.S.C. 154(b) by 160 days.

(21) Appl. No.: 14/353,618

(22) PCT Filed: Oct. 24, 2012

(86) PCT No.: PCT/CN2012/083420
§ 371 (c)(1),
(2) Date: Jun. 6, 2014

(87) PCT Pub. No.: WO2013/060267
PCT Pub. Date: May 2, 2013

(65) Prior Publication Data
US 2014/0290274 A1    Oct. 2, 2014

(30) Foreign Application Priority Data

Oct. 24, 2011   (CN) .................. 2011 1 0325875

(51) Int. Cl.
F25B 25/00 (2006.01)
C09K 5/14 (2006.01)
F25B 21/00 (2006.01)
H01F 1/01 (2006.01)
C22C 38/00 (2006.01)
C22C 38/02 (2006.01)
C22C 38/30 (2006.01)
C22C 28/00 (2006.01)
C22C 38/04 (2006.01)
C22C 38/10 (2006.01)
B22F 9/04 (2006.01)

(52) U.S. Cl.
CPC ............... *F25B 21/00* (2013.01); *C09K 5/14* (2013.01); *C22C 28/00* (2013.01); *C22C 38/005* (2013.01); *C22C 38/02* (2013.01); *C22C 38/04* (2013.01); *C22C 38/10* (2013.01); *C22C 38/30* (2013.01); *H01F 1/015* (2013.01); *B22F 9/04* (2013.01); *B22F 2999/00* (2013.01);
(Continued)

(58) Field of Classification Search
CPC ................................ F25B 21/00; C09K 5/14
USPC .......................................................... 62/3.1
See application file for complete search history.

(56) References Cited

U.S. PATENT DOCUMENTS 5,186,765 A    2/1993  Arai et al.
5,449,416 A *  9/1995  Arai .................. B22F 1/0014
                                                   148/301
(Continued)

FOREIGN PATENT DOCUMENTS

CN    1450190      * 10/2003
CN    1450190 A    * 10/2003
(Continued)

OTHER PUBLICATIONS

Niu et al. Study of granularity effect Gd5Si2Ge2. Dec. 31, 2004.*
(Continued)

*Primary Examiner* — Nicole M Buie-Hatcher
*Assistant Examiner* — M. Reza Asdjodi
(74) *Attorney, Agent, or Firm* — Cantor Colburn LLP

(57) ABSTRACT

The invention provides a first-order phase-transition La(Fe, Si)$_{13}$-based magnetocaloric material showing small hysteresis loss, and preparation and use thereof. The material has a NaZn$_{13}$-type structure, is composed of granules with a particle size in the range of 15~200 μm and not less than 15 μm, and is represented by chemical formula La$_{1-x}$R$_x$(Fe$_{1-p-q}$Co$_p$Mn$_q$)$_{13-y}$Si$_y$A$_\alpha$. The method for preparing the material comprises steps of preparing the material La$_{1-x}$R$_x$(Fe$_{1-p-q}$Co$_p$Mn$_q$)$_{13-y}$Si$_y$A$_\alpha$ by smelting and annealing; and then crushing the material into powder with a particle size in the range of 15~200 μm. Without changing the components, a La(Fe,Si)$_{13}$-based magnetocaloric material showing small hysteresis loss and strong magnetocaloric effect can be obtained by adjusting the particle size within the range of 15~200 μm. Utilization of this type of materials in the practical magnetic refrigeration application is of great significance. When the particle size is 10 μm or less, the stability of the magnetocaloric material is lost; the magnitude of magnetic entropy change is reduced dramatically; and thus it is no longer suitable for the practical application in magnetic refrigeration technology. Therefore, the giant magnetocaloric effect of the material can be maintained to the max if the granules with a particle size of less than 10 μm are removed by screening.

11 Claims, 12 Drawing Sheets

(52) U.S. Cl.
CPC .... *C22C 2202/02* (2013.01); *F25B 2321/002* (2013.01); *Y10T 428/2982* (2015.01)

(56) References Cited

U.S. PATENT DOCUMENTS

| | | | | |
|---|---|---|---|---|
| 5,743,095 | A * | 4/1998 | Gschneidner, Jr. | ..... F25B 21/00 148/301 |
| 2010/0047527 | A1 | 2/2010 | Katter | |
| 2011/0173993 | A1 * | 7/2011 | Muller | .................... F25B 21/00 62/3.1 |
| 2014/0290274 | A1 * | 10/2014 | Hu | ........................... C09K 5/14 62/3.1 |
| 2015/0047371 | A1 * | 2/2015 | Hu | ........................... H01F 1/015 62/3.1 |

FOREIGN PATENT DOCUMENTS

| | | |
|---|---|---|
| CN | 101477864 A | 7/2009 |
| CN | 101755312 A | 6/2010 |
| EP | 0411591 A2 | 2/1991 |
| JP | 2007-84897 A | 4/2007 |

OTHER PUBLICATIONS

Study on the granularity effect of Gd5Si2Ge2 giant magnetic entropy change alloy, functional materials, Niu Peili et al., 2004, supplement, vol. 35, pp. 626 to 629, Dec. 31, 2004 sections 3.2, 4.
English Machine Translation of Study on the granularity effect of Gd5Si2Ge2 giant magnetic entropy change alloy, functional materials, Niu Peili et al., 2004, supplement, vol. 35, pp. 626 to 629, Dec. 31, 2004 sections 3.2, 4.
International Search Report for International Application No. PCT/CN2012/083420.
English Abstract for CN1450190A.
International Search Report for International Application No. PCT/CN2012/075662.
English Translation of Abstract for CN101477864.
English Translation of Abstract for CN101755312.
English Translation of Abstract for JP2007-84897.

* cited by examiner

FIRST-ORDER PHASE-TRANSITION LA(FE,SI)$_{13}$-BASED MAGNETOCALORIC MATERIAL SHOWING SMALL HYSTERESIS LOSS AND PREPARATION AND USE THEREOF

CROSS REFERENCE TO RELATED APPLICATIONS

This application is a National Phase Application of Patent Application PCT/CN2012/083420 filed on Oct. 24, 2012, which claims priority to CN 2011103258755 filed on Oct. 24, 2011, the contents each of which are incorporated herein by reference thereto.

TECHNICAL FIELD

The invention relates to a first-order phase-transition La(Fe,Si)$_{13}$-based magnetocaloric material showing small hysteresis loss, a method for preparing the same, a magnetic refrigerator comprising the same and use of the same in the manufacture of refrigeration materials.

BACKGROUND ART

Over 15% of the total energy consumption is used for refrigeration. Now, the commonly used gas compression refrigeration technology has many disadvantages such as high energy consumption and environmental pollution, etc. Therefore, exploration of pollution-free and environment friendly refrigeration materials and development of novel refrigeration technologies with low energy consumption and high efficiency become very urgent in the whole world.

Magnetic refrigeration technology, as characterized by environment friendly, energy efficient, stable and reliable, has drawn great attention worldwide in recent years. Several types of giant magnetocaloric materials at room temperature and even high temperature zone were found successionally in US, China, Holland and Japan, which significantly increased the expectation for environment friendly magnetic refrigeration technology, e.g. Gd—Si—Ge, LaCaMnO$_3$, Ni—Mn—Ga, La (Fe, Si)$_{13}$-based compound, Mn—Fe—P—As, MnAs-based compound, etc. Common features of these novel giant magnetocaloric materials lie in that their magnetic entropy changes are all higher than that of the traditional magnetic refrigeration material Gd working around room temperature (R. T.), their phase-transition properties are of the first-order, most of them show strong magnetocrystalline coupling characteristics, and magnetic phase transition is accompanied with distinct crystalline structural transition. These novel materials also show different features. For example, Gd—Si—Ge is not only expensive but also requires further purification of the raw material while being prepared. And the raw materials used to prepare Mn—Fe—P—As and MnAs-based compound, etc. are toxic; NiMn-based Heusler alloy shows large hysteresis loss, and so on.

Among the several novel materials found in the past over ten years, La(Fe, Si)$_{13}$-based compound is commonly accepted worldwide and has the highest potential for magnetic refrigeration application in a high temperature zone or even at R.T. This alloy has many characters shown as follows: the cost of its raw material is low; phase-transition temperature, phase-transition nature and hysteresis loss may vary upon component adjustment; its magnetic entropy change around R.T. is higher than that of Gd by one fold. In the laboratories/companies of many countries, La(Fe,Si)$_{13}$-based magnetic refrigeration material has been used for prototype test, which proved its refrigerating capacity is better than that of Gd.

The phase-transition nature of La(Fe, Si)$_{13}$-based compound varies with the adjustment of its components. For example, for the compound with low Si amount, its phase-transition property is normally of the first-order. Upon the increasing of Co content, the Curie temperature increases, the first-order phase-transition nature is weakened and gradually transited to the second order (no hysteresis loss for the second-order phase transition); thus hysteresis loss is decreased gradually. However, due to the component change and exchange interaction, the magnitude of magnetocaloric effect is also reduced in turn. Addition of Mn can lower the Curie temperature by impacting the exchange interaction; the first-order phase-transition nature is weakened; hysteresis loss is decreased gradually; and the magnitude of magnetocaloric effect is also reduced in turn. In contrast, it was found that replacement of La with small rare earth magnetic atoms (e.g. Ce, Pr, Nd) can enhance the first-order phase-transition nature; and increase hysteresis loss and the magnitude of magnetocaloric effect. It was expected that the first-order phase-transition La(Fe,Si)$_{13}$-based compound showing a giant magnetocaloric effect can be used in magnetic refrigeration application in practice, so as to achieve ideal refrigerating effect.

However, the La(Fe,Si)$_{13}$-based compound having a first-order phase-transition nature although shows giant magnetocaloric effect, is often accompanied with significant hysteresis loss, which results in heat leaking in the refrigeration cycles of a magnetic refrigerator. Refrigerating efficiency will be enormously reduced by the significant hysteresis loss resulted in the first-order phase-transition process.

CONTENTS OF THE INVENTION

Therefore, the objective of the invention is to provide a first-order phase-transition La(Fe,Si)$_{13}$-based magnetocaloric material showing small hysteresis loss, a method for preparing the same, a magnetic refrigerator comprising the same and use of the same in the manufacture of refrigeration materials.

Hysteresis loss is an intrinsic property of a first-order phase-transition system. Reduction of hysteresis loss can significantly improve refrigerating efficiency. Hysteresis is mainly caused by two types of factors, one includes the intrinsic factors such as nucleation factor, crystal boundary, internal stress, friction force at phase boundaries, and so on during phase transition; the other includes extrinsic factors, such as field changing rate, heat exchange with ambience and so on.

The present inventors crush the first-order phase-transition La(Fe,Si)$_{13}$-based magnetocaloric material showing giant hysteresis loss into irregular powder with a particle size of 15~200 micron (μm), without changing its components. It was found surprisingly that hysteresis loss was reduced upon decrease of granularity. Where the particle size was not less than 15 μm, none of material structure, atom occupancy and interatomic distance was impacted. As a result, ferromagnetic exchange interaction was not affected; both ferromagnetic-paramagnetic phase-transition temperature (Curie temperature) and saturation magnetization remained the same; and the material still showed giant magnetocaloric effect. Where the particle size was less than 10 μm, α-Fe was separated out of the material or the material was decomposed due to the accumulation of stress introduced in the process of powder grinding. Although hysteresis loss was further reduced, the magnitude of magnetocaloric effect was also decreased accordingly. It is demonstrated by the result that La(Fe,Si)$_{13}$-based magnetocaloric material showing small hysteresis loss and strong magnetocaloric effect can be obtained where the granularity is adjusted in the range of 15~200 μm. By way of crushing the material, grain boundaries were reduced and specific surface area was increased effectively. It was found that hysteresis loss was reduced dramatically upon the decrease of particle size. Practical applications of this type of materials in magnetic refrigeration have important significance.

For better understanding of the invention, the following definitions are used. The terms defined herein have the meaning generally understood by those skilled in the art.

Unless otherwise indicated, the "NaZn$_{13}$-type structure" or "1:13 structure" corresponding to the terms "LaFe$_{13-x}$M$_x$" as used herein means a structure in which the space group is Fm$\bar{3}$c. Fe atom occupies two crystal sites 8b (Fe$^I$) and 96i (Fe$^{II}$) in a ratio of 1:12, respectively. La and Fe$^I$ atoms constitute CsCl structure, in which La atom is surrounded by 24Fe$^{II}$ atoms; Fe$^I$ atom is surrounded by 12Fe$^{II}$ atoms constituting an icosahedron; and around each Fe$^{II}$ atom, there are 9 nearest-neighbor Fe$^{II}$ atoms, 1Fe$^I$ atom and 1 La atom. For LaFe$_{13-x}$M$_x$ (M=Al, Si) compound, its neutron diffraction experiment showed that the 8b site is fully occupied by Fe atom; and 96i site is occupied by M atom and the rest Fe atom randomly.

The objects of the invention are accomplished by the following technical solutions.

The present invention provides a first-order phase-transition La(Fe,Si)$_{13}$-based magnetocaloric material showing small hysteresis loss. This material has a NaZn$_{13}$-type structure, is composed of granules with a particle size in the range of 15~200 μm and of not less than 15 μm.

For the magnetocaloric material according to the present invention, when the particle size is reduced to 15 μm or less, particularly 10 μm or less, its stability is lost; metamagnetic transition behavior is weakened; magnetic entropy change range is reduced dramatically; and thus it is no longer suitable for the practical application of magnetic refrigeration technology. Therefore, the giant magnetocaloric effect of the material can be maintained to the max if the granules with a particle size of less than 10 μm are removed by screening.

The magnetocaloric material is represented by the following chemical formula:

La$_{1-x}$R$_x$(Fe$_{1-p-q}$Co$_p$Mn$_q$)$_{13-y}$Si$_y$A$_\alpha$, wherein R is one or more selected from elements cerium (Ce), praseodymium (Pr) and neodymium (Nd), A is one or more selected from elements carbon (C), hydrogen (H) and boron (B), x is in the range of 0<x≤0.5, y is in the range of 0.8<y≤1.6, p is in the range of 0≤p≤0.2, q is in the range of 0≤q≤0.2, α is in the range of 0≤α≤3.0.

In some embodiments of the present invention, the magnetocaloric material is represented by the following chemical formula:

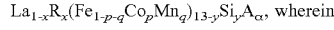La$_{1-x}$R$_x$(Fe$_{1-p-q}$Co$_p$Mn$_q$)$_{13-y}$Si$_y$A$_\alpha$, wherein R is one or more selected from elements cerium (Ce), praseodymium (Pr) and neodymium (Nd), A is one or more selected from elements carbon (C), hydrogen (H) and boron (B), x is in the range of 0<x≤0.5, y is in the range of 1.0≤y≤1.6, p is in the range of 0≤p≤0.05, q is in the range of 0≤q≤0.03, α is in the range of 0≤α≤1.8.

In the chemical formula representing the magnetocaloric material of the invention, A represents interstitial atoms (e.g. carbon, hydrogen and boron) with small atomic radii. All these interstitial atoms, while added, occupy the 24d-interstitial position and have the same impact on structure. Preferably, α is in the range of 0.1≤α≤2.0.

The material possesses a first-order phase-transition property, and a bulk material exhibits clear magnetic hysteresis loss. When particle size is in the range of 15~50 μm, its maximal intrinsic hysteresis loss is less than 60 J/kg.

In some embodiments of the present invention, the magnetocaloric material is represented by the following chemical formula:

La$_{1-x}$R$_x$(Fe$_{1-p}$Co$_p$)$_{13-y}$Si$_y$A$_\alpha$, wherein, R is one or more selected from elements Ce, Pr and Nd, A is one or two selected from elements H, C and B, x is in the range of 0.2≤x≤0.5, y is in the range of 0.8<y≤1.6, p is in the range of 0≤p≤0.03, α is in the range of 0.1≤α≤2.0.

For example, in a more specific embodiment of the invention, the magnetocaloric material can be represented by chemical formula: La$_{0.7}$Ce$_{0.3}$Fe$_{11.6}$Si$_{1.4}$C$_{0.2}$; La$_{0.7}$(Ce, Pr, Nd)$_{0.3}$(Fe$_{0.98}$Co$_{0.02}$)$_{11.6}$Si$_{1.4}$; La$_{0.5}$Pr$_{0.5}$Fe$_{11.5}$Si$_{1.5}$; La$_{0.7}$(Ce,Pr,Nd)$_{0.3}$Fe$_{11.6}$Si$_{1.4}$C$_{0.01}$H$_{1.7}$; La$_{0.7}$(Ce,Pr, Nd)$_{0.3}$Fe$_{11.6}$Si$_{1.4}$C$_{0.01}$B$_{0.02}$H$_{0.6}$; La$_{0.95}$Ce$_{0.05}$(Fe$_{0.94}$Co$_{0.03}$Mn$_{0.03}$)$_{11.9}$Si$_{1.1}$; La$_{0.7}$(Ce,Pr, Nd)$_{0.3}$(Fe$_{0.96}$Co$_{0.04}$)$_{11.6}$Si$_{1.4}$.

As for the magnetocaloric material according to the invention, the particle size is preferably 15 μm or more, such as in the range of 15~200 and more preferably 15~50 μm.

Preferably, as for the magnetocaloric material according to the invention, while magnetic field changes from 0 to 5 T, the effective magnetic entropy change is 5.0~50.0 J/kgK, and the temperature range of phase transition is within 10-400K.

The invention further provides a method for preparing the magnetocaloric material, which comprises steps of 1) preparing raw material other than hydrogen according to the chemical formula;

2) placing and vacuuming the raw material prepared in step 1) in an arc furnace, washing it with argon gas, and smelting it under the protection of argon gas, so as to obtain the alloy ingots;

3) vacuum annealing the alloy ingots obtained in step 2) and then quenching the alloy ingots in liquid nitrogen or water, so as to obtain the magnetocaloric material La$_{1-x}$R$_x$(Fe$_{1-p-q}$Co$_p$Mn$_q$)$_{13-y}$Si$_y$A$_\alpha$ having a NaZn$_{13}$-type structure;

4) crushing, grinding and screening magnetocaloric material obtained from step 3), so as to obtain granules with a particle size of 15~200 μm;

wherein, when A in the chemical formula includes element hydrogen, the method further comprises a step of 5) annealing the granules obtained from step 4) in hydrogen, or annealing the magnetocaloric material obtained from step 3) in hydrogen after being roughly crushed, and then carrying out step 4).

In the step 4) of the preparing method according the invention, granules with a particle size less than 15 μm, particularly less than 10 μm are removed by screening.

In the preparing method according the invention, the raw materials La and R are commercially available elementary rare earth elements, or industrial-pure LaCe alloy or industrial-pure LaCePrNd mischmetal. Commercialized industrial-pure LaCe alloy normally has a purity of 95-98 at. %

(atomic ratio) and an atomic ratio of La:Ce in the range of 1:1.6-1:2.3; and the industrial-pure LaCePrNd mischmetal normally has a purity of about 99 wt. %. The insufficiency of La element in the raw material LaCe alloy for preparing $La_{1-x}R_x(Fe_{1-p-q}Co_pMn_q)_{13-y}Si_yA_\alpha$ can be supplemented by elementary La. Similarly, industrial-pure LaCePrNd mischmetal can also be processed in accordance with above.

Where A includes carbon element, preferably the carbon can be provided by FeC alloy. Since the FeC alloy also contains Fe element, the added amount of elementary Fe needs to be properly reduced, so that the ratio of the added elements still meets the requirement for the atomic ratio in the chemical formula of the magnetic material.

All the other raw materials in the chemical formula are commercially available individual elementary substance.

According to the preparation method of the invention, specifically, the step 2) can comprise the steps of placing the raw material prepared in step 1) into an arc furnace; vacuuming the arc furnace to reach a vacuum degree less than $1\times10^{-2}$ Pa; washing the furnace chamber with argon gas having a purity higher than 99 wt. % once or twice; then filling the furnace chamber with the argon gas to reach 0.5-1.5 atm.; and arcing; so as to obtain the alloy ingots; wherein each alloy ingot is smelted at 1500-2500° C. for 1-6 times, e.g. 2-6 time repeatedly.

According to the preparation method of the invention, specifically, the step 3) can comprise the steps of annealing the alloy ingots obtained from step 2) at 1000-1400° C., with a vacuum degree less than $1\times10^{-3}$ Pa, for 1 hour-60 days; then quenching the alloy ingots in liquid nitrogen or water.

According to the preparation method of the invention, specifically, the step 4) can comprise the steps of crushing and/or cutting the magnetocaloric material prepared in step 3) into crude granules with a particle size of less than 1 mm; further grinding the crude granules in an agate mortar under the protection of shielding gas or liquid until the particle size is ≤200 μm; screening the metal powder through a standard sieve; and collecting the granules with a particle size in the range of 15~200 μm, preferably 15~50 μm.

According to the preparation method of the invention, wherein, in the step 5), the amount of hydrogen in the alloy is controlled by adjusting hydrogen pressure, annealing temperature and annealing period. In general, hydrogen pressure is $10^{-3}$ Pa to 80 atm.; annealing temperature is 0-400° C.; and annealing period is 1 min to 24 hours.

The present invention further provides a magnetic refrigerator which comprises the magnetocaloric material of the invention or the magnetocaloric material prepared by the method of the invention.

The present invention also provides use of the magnetocaloric material of the invention or the magnetocaloric material prepared by the method of the invention in the manufacture of a refrigeration material.

Compared with prior art, the invention has advantages shown as follows. As for a $La(Fe,Si)_{13}$-based magnetocaloric material, usually the effective method for reducing hysteresis loss is adjusting components. However, the decrease of hysteresis loss is always accompanied with great reduction of magnetocaloric effect magnitude. On the contrary, in the present invention, without changing the components, the bulk material is cut into irregular powder with a particle size in the range of 15~200 μm under the protection of shielding gas atmosphere or liquid, which greatly reduces hysteresis loss (reduction ratio may be up to 64%) but keeps the magnitude of magnetocaloric effect at the same level essentially. As a result, the present invention is of great importance in the practical industrialization of a $La(Fe,Si)_{13}$-based magnetocaloric material in magnetic refrigeration application.

DESCRIPTION OF THE DRAWINGS

The embodiments of the invention are further illustrated with reference to the following figures, wherein.

SPECIFIC MODES FOR CARRYING OUT THE INVENTION

Figure 1:
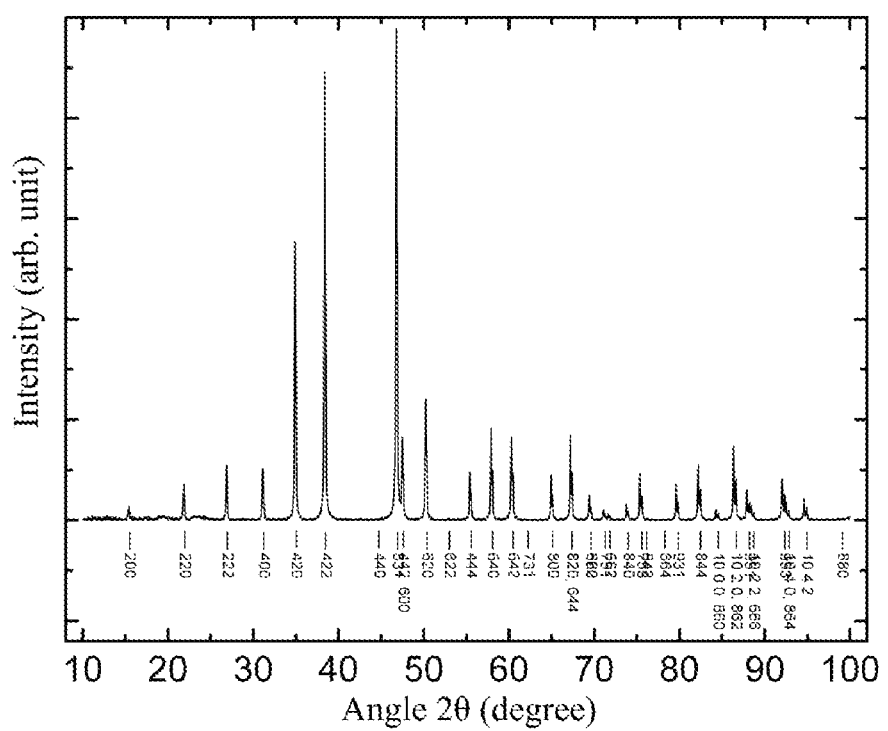
FIG. 1 shows the room temperature X-ray diffraction (XRD) spectrum of samples $La_{0.7}Ce_{0.3}Fe_{11.6}Si_{1.4}C_{0.2}$ prepared in Example 1.

The invention is further described by referring to the Examples. It should be understood by those skilled in the art that the following Examples are provided for the purpose of illustrating the invention only and are not intended to restrict the scope of the invention by any means.

The raw materials and equipment used in the Examples are described as follows:

(1) The raw materials used in the Examples include: commercially available LaCe alloy having a purity of 97.03 at. % and a La:Ce atomic ratio of 1:1.88, purchased from Inner Mongolia Baotou Steel Rare Earth International Trade Ltd.; La—Ce—Pr—Nd mischmetal, having a purity of 99.6 wt. % and a La:Ce:Pr:Nd ratio of 28.3 wt. % La:50.5 wt. % Ce:5.2 wt. % Pr:15.7 wt. % Nd, purchased from Inner Mongolia Baotou Steel Rare Earth International Trade Ltd. Other raw materials and purities thereof are shown as follows: elementary La (purity: 99.52 wt %), elementary Ce (99.90 wt. %), elementary Pr (98.97 wt. %), elementary Nd (99.9 wt. %), purchased from Hunan Shenghua Rare Earth Metal Material Ltd.; Fe (99.9 wt %), purchased from Beijing Research Institute for Nonferrous Metals; FeC (99.9 wt %, Fe:C weight ratio of 95.76:4.24), smelted from elementary C and Fe having a purity of 99.9 wt %; Si (99.91 wt %), purchased from Beijing Research Institute for Nonferrous Metals; Co (99.97 wt %), purchased from Beijing Research Institute for Nonferrous Metals; Mn (99.8 wt. %), purchased from Beijing Shuanghuan Chemical Reagent Factory; FeB alloy (99.9 wt. %, Fe:B weight ratio of 77.6 wt. %:22.4 wt. %), purchased from Beijing Zhongke Sanhuan High Technology Ltd. (All the above raw materials were in blocks).

(2) The arc furnace (Model: WK-II non-consumable vacuum arc furnace) was manufactured by Beijing Wuke Electrooptical Technology Ltd.; the Cu-targeted X-ray diffractometer (Model: RINT2400) was manufactured by Rigaku; and the Superconducting Quantum Interference Vibrating Sample Magnetometer (Model: MPMS (SQUID) VSM) was manufactured by Quantum Design (USA).

Example 1

First-Order Phase-Transition Magnetocaloric Material $La_{0.7}Ce_{0.3}Fe_{11.6}Si_{1.4}C_{0.2}$ Showing Small Hysteresis Loss 1) The materials were prepared in accordance with the chemical formula $La_{0.7}Ce_{0.3}Fe_{11.6}Si_{1.4}C_{0.2}$. The raw materials included LaCe alloy, Fe, Si, La and FeC, wherein elementary La was added to make up the La insufficience in the LaCe alloy; C was provided by the FeC alloy; the amount of the elementary Fe added thereto was reduced properly since the FeC alloy contains Fe element, so that the proportion of each element added still met the requirement for the atomic ratio in the chemical formula of the magnetic material.

2) The raw materials prepared in step 1), after mixed, was loaded into an arc furnace. The arc furnace was vacuumized to a pressure of $2\times10^{-3}$ Pa, washed with high-purity argon with a purity of 99.996% twice, and then filled with high-purity argon with a purity of 99.996% to a pressure of 1 atm. The arc was struck (the raw materials were smelted together to form alloy after striking) to generate alloy ingot. Each alloy ingot was smelted at a temperature of 2000° C. repeatedly for 4 times. After the smelting, ingot alloys were obtained by cooling down in a copper crucible.

3) After wrapped separately with molybdenum foil and sealed in a vacuumized quartz tube ($1\times10^{-4}$ Pa), the ingot alloys obtained from step 2) were annealed at 1080° C. for 30 days followed by being quenched in liquid nitrogen by breaking the quartz tube. As a result, samples $La_{0.7}Ce_{0.3}Fe_{11.6}Si_{1.4}C_{0.2}$ having a $NaZn_{13}$-type structure were obtained.

4) The material obtained in step 3) was crushed and cut into crude granules with a particle size of less than 1 mm. The crude granules were further grinded into irregular powder with a particle size ≤200 μm in an agate mortar under the protection of acetone. The resultant metal powder was then screened through standard sieves with different mesh number so as to collect the powder with particle sizes within different ranges. To prevent oxidation, the screening process was conducted under the protection of acetone liquid. The detailed screening modes are shown as follows:

Powder sample with a particle size in the range of 90~120 μm was obtained by screening through 170-mesh and 120-mesh standard sieves;

Powder sample with a particle size in the range of 50~90 μm was obtained by screening through 270-mesh and 170-mesh standard sieves;

Powder sample with a particle size in the range of 15~50 μm was obtained by screening through 800-mesh and 270-mesh standard sieves;

Powder sample with a particle size of less than 10 μm was obtained by screening through a 1600-mesh standard sieve.

Sample Test and Result Analysis

I. The X-ray diffraction (XRD) spectrum of the samples $La_{0.7}Ce_{0.3}Fe_{11.6}Si_{1.4}C_{0.2}$ at room temperature was measured using the Cu-target X-ray diffractometer. The result, as shown in FIG. 1, indicated that this sample had a pure $NaZn_{13}$-type singe-phase structure and almost no impurity was present.

Figure 2:
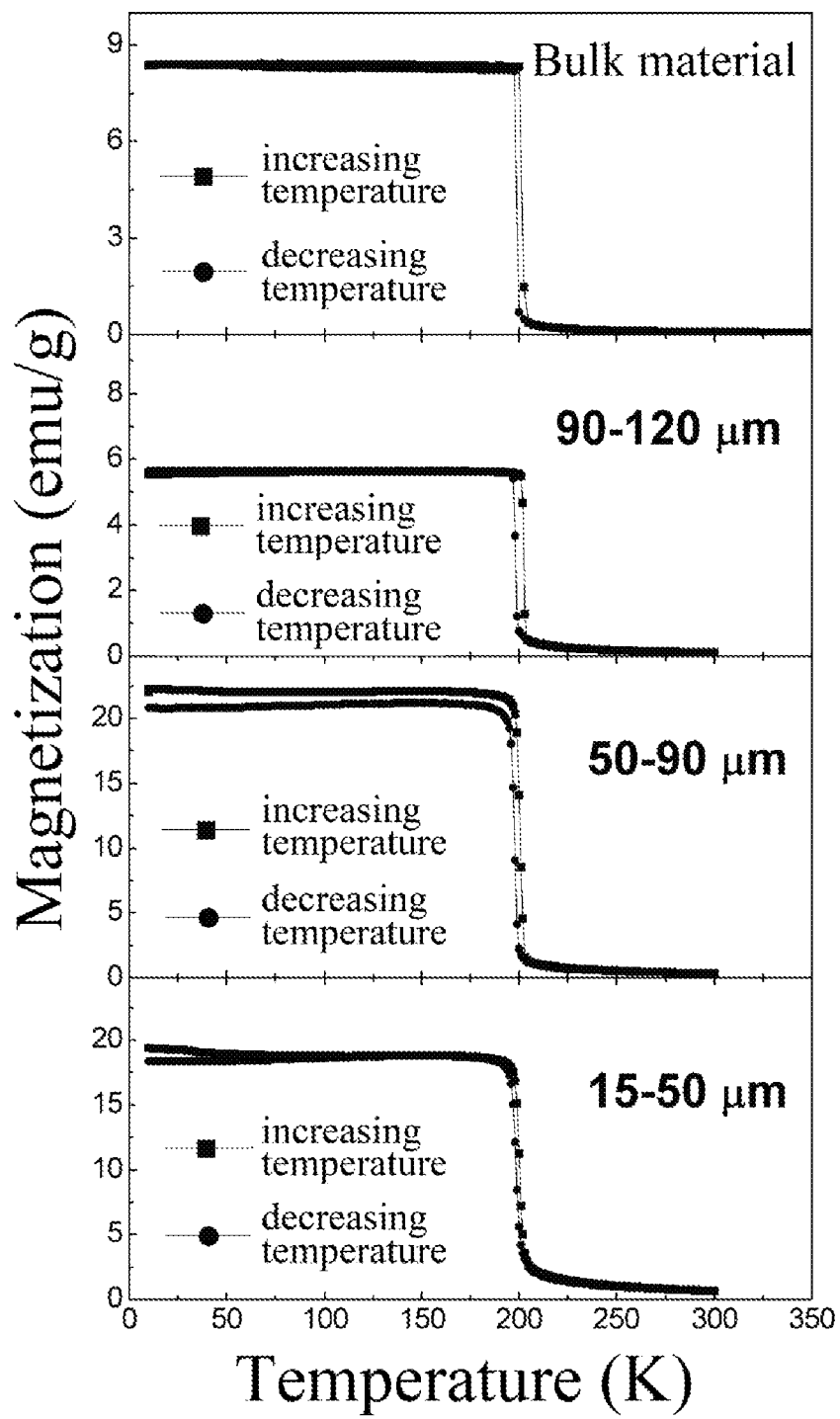
FIG. 2 shows the thermomagnetic (M-T) curves of $La_{0.7}Ce_{0.3}Fe_{11.6}Si_{1.4}C_{0.2}$ measured in a magnetic field of 0.02 T for bulk material and samples with a particle size within 3 ranges (90~120 μm, 50~90 μm, 15~50 μm) prepared in Example 1.

II. The thermomagnetic curves (M-T) of $La_{0.7}Ce_{0.3}Fe_{11.6}Si_{1.4}C_{0.2}$ bulk material (single granule, weight: 2.7 mg) and samples with particle size within various ranges (90~120 μm (weight: 2.31 mg), 50~90 μm (weight: 1.86 mg), 15~50 μm (weight: 1.28 mg), <10 μm (weight: 0.86 mg)) were measured in a magnetic field of 0.02 T, using the Superconducting Quantum Interference Vibrating Sample Magnetometer 【MPMS(SQUID)VSM】, as shown in FIG. 2. The result showed that except the Curie temperature of the sample with a particle size <10 μm was raised to a temperature higher than 203K (because α-Fe might be separated out from the cumulative material introducing stress in the grinding process, relative Si content was increased), the Curie temperatures of samples with particle size within other three ranges were 200K, same as that of the bulk material.

Figure 3:
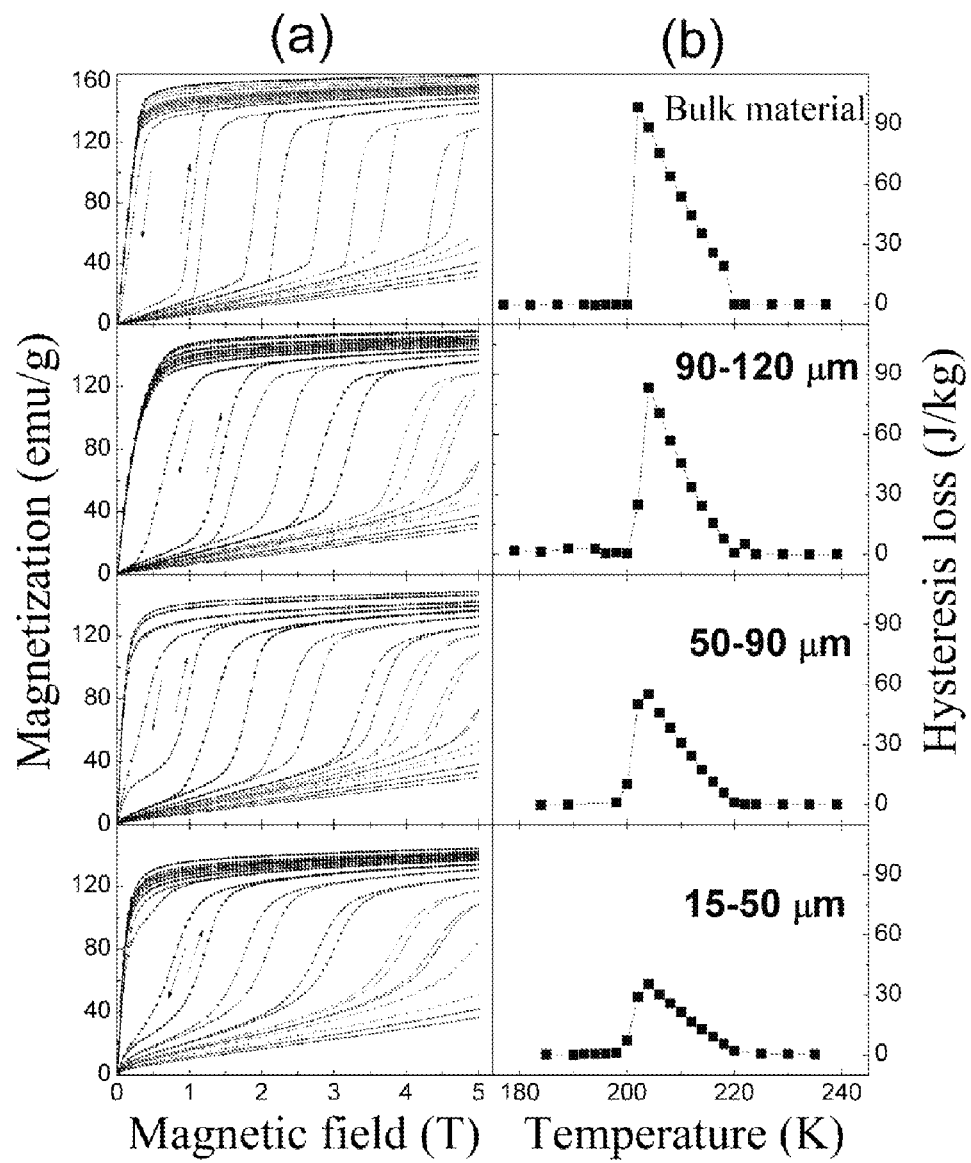
FIG. 3 shows a) the magnetization curves (M-H curve) on increasing and decreasing field; b) the dependency of hysteresis loss on temperature, for $La_{0.7}Ce_{0.3}Fe_{11.6}Si_{1.4}C_{0.2}$ bulk material and samples with a particle size within 3 ranges (90~120 μm, 50~90 μm, 15~50 μm) prepared in Example 1.

III. The magnetization curves (M-H curves) of $La_{0.7}Ce_{0.3}Fe_{11.6}Si_{1.4}C_{0.2}$ bulk material (single granule, weight: 2.7 mg) and samples with particle sizes within various ranges (90~120 µm (weight: 2.31 mg), 50~90 µm (weight: 1.86 mg), 15~50 µm (weight: 1.28 mg), <10 µm (weight: 0.86 mg)) were measured on the MPMS (SQUID) VSM at different temperatures in the process of increasing and decreasing field. The rates of increasing and decreasing field were the same, both 500 Oe/second. FIGS. 3(a) and (b) shows the M-H curves in the process of increasing and decreasing field and the dependency of hysteresis loss on temperature, respectively, for the bulk material and the samples with particle sizes within the three ranges. The presence of a clear inflection point in the M-H curves indicated that metamagnetic transition from paramagnetic to ferromagnetic state was induced by the magnetic field. Through the comparison of all the curves, it can be observed that hysteresis loss was greatly reduced as the particle size was decreased; maximal magnetic hysteresis was reduced from 98.4 J/kg (for the bulk material) to 35.4 J/kg (for particle size in the range of 15~50 µm), and the reduction rate was up to 64%. The M-H curve is a straight line in the high temperature zone (1:13-phase paramagnetic zone), which indirectly demonstrates that both the bulk material and the samples with particle sizes within the three ranges are pure 1:13-phase and almost no α-Fe-phase was present.

Figure 4:
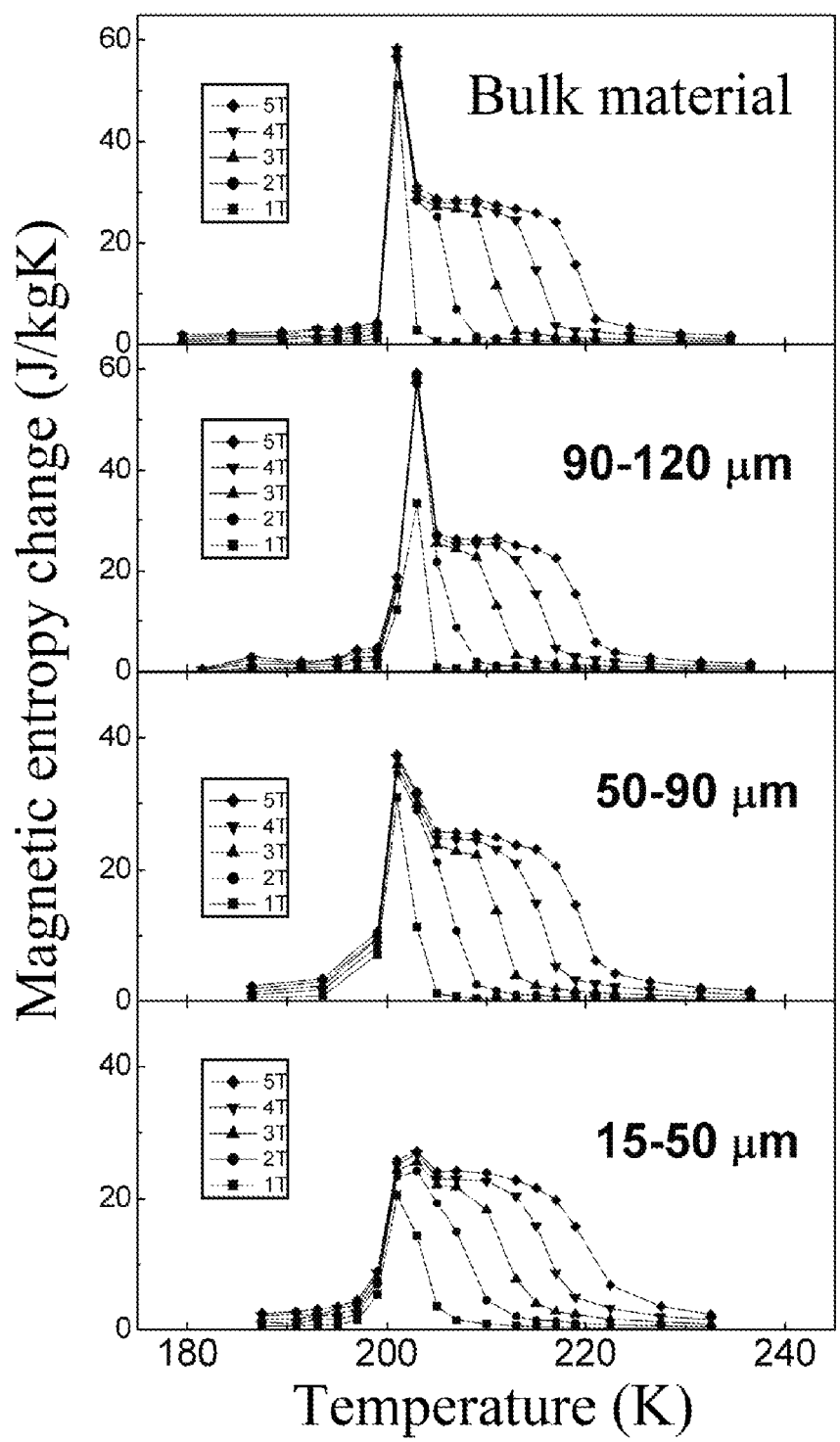
FIG. 4 indicates the dependency of the ΔS on temperature in the process of increasing the field under various magnetic fields for $La_{0.7}Ce_{0.3}Fe_{11.6}Si_{1.4}C_{0.2}$ bulk material and samples with a particle size within 3 ranges (90~120 μm, 50~90 μm, 15~50 μm) prepared in Example 1.

IV. On the basis of the Maxwell's equation $$\Delta S(T, H) = S(T, H) - S(T, 0) = \int_0^H \left(\frac{\partial M}{\partial T}\right)_H dH,$$

the magnetic entropy change, ΔS, can be calculated according to the isothermal magnetization curve. FIG. 4 shows the dependency of ΔS on temperature in the process of increasing field in different magnetic fields for the bulk material and the samples $La_{0.7}Ce_{0.3}Fe_{11.6}Si_{1.4}C_{0.2}$ with particle sizes within the three ranges. From FIG. 4, it was observed that the ΔS peak shape extended asymmetrically towards the high-temperature zone while the field was increased; a sharp peak was followed by a plateau, which is a typical feature of a $La(Fe,Si)_{13}$-based first-order phase transition system and caused by the metamagnetic transition behavior induced by the magnetic field at a temperature higher than the Curie temperature. The ΔS peak shape further confirmed the existence of the first-order phase-transition property and metamagnetic behavior of the system. It has been demonstrated by some studies that the appearance of the sharp ΔS peak is caused by the coexistence of two phases during the first-order phase transition. The extremely sharp peak is a false signal and does not involving thermal effect, but the followed ΔS plateau reflects the real property of magnetocaloric effect. From above, it can be found that both $La_{0.7}Ce_{0.3}Fe_{11.6}Si_{1.4}C_{0.2}$ bulk material and samples with particle sizes within the three ranges maintained great effective magnetic entropy change, i.e. an average value of 26 J/kgK.

Figure 5:
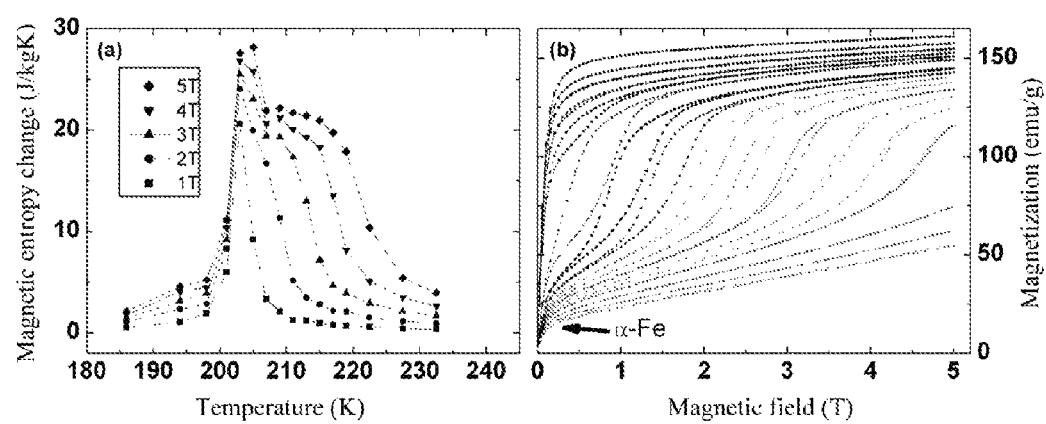
FIG. 5 indicates a) the magnetization curves (M-H curve) of the powder sample $La_{0.7}Ce_{0.3}Fe_{11.6}Si_{1.4}C_{0.2}$ with a particle size <10 μm (an average particle size of about 8 μm) prepared in Example 1; b) the dependency of the ΔS of such a sample on temperature in the process of increasing the field under various magnetic fields.
Figure 6:
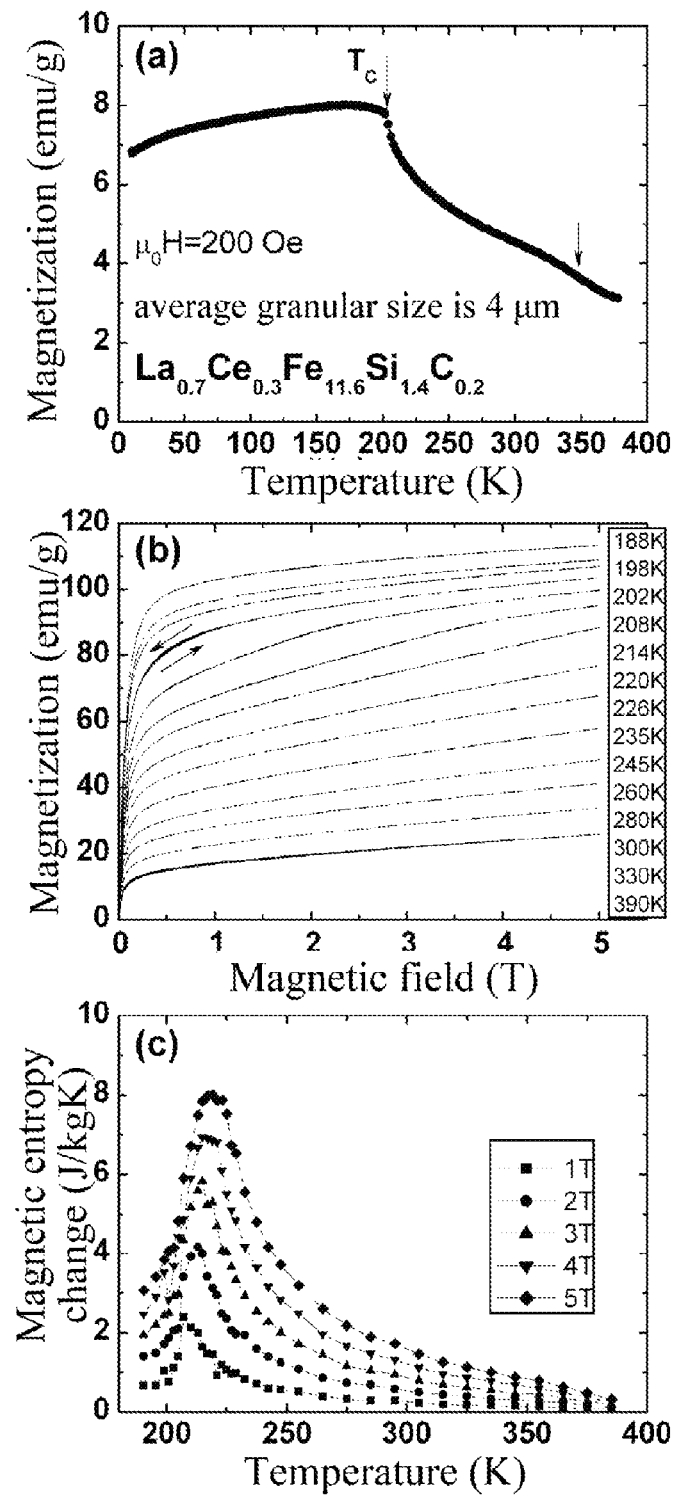
FIG. 6 indicates a) the thermomagnetic (M-T) curves and b) the magnetization curves (M-H curve) of the powder sample $La_{0.7}Ce_{0.3}Fe_{11.6}Si_{1.4}C_{0.2}$ with a particle size <10 μm (an average particle size of about 4 μm) prepared in Example 1; c) the dependency of the ΔS of such a sample on temperature in the process of increasing the field under various magnetic fields.

As compared with the above results, FIGS. 5(a) and (b) show the M-H curve and magnetic entropy change-temperature curve while the particle size range was reduced to <10 µm (average particle size was about 8 µm), respectively. From FIG. 5, it can be observed that while the particle size was reduced to <10 µm, although maximal magnetic hysteresis was further reduced to 27 J/kg, separation of α-Fe phase allowed the magnitude of magnetocaloric effect to be decreased to 21 J/kgK. In FIG. 5(a), the M-H curve is still in a curl shape in the 1:13-phase paramagnetic and high temperature zone, which is caused by α-Fe impurity phase and indicates the separation of α-Fe phase. After being further ground, the sample with a smaller particle size was obtained. FIGS. 6(a), (b) and (c) show M-T heating curve, magnetization curve (M-H curve) at different temperature and magnetic entropy change-temperature curve of the material while the average particle size was reduced to 4 µm, respectively. From FIG. 6(a), it can be observed that magnetic transformation occurred around the Curie temperature $T_C$ of 200K; magnetization was still high at temperatures higher than the $T_C$ and failed to be reduced to zero even at up to 390K; the uplift of the M-T curve around 350K indicated the 1:13 phase might be decomposed and the stability of the material was lost. Isothermal magnetization curve shows that while the average particle size was decreased to about 4 µm, magnetic hysteresis of the material essentially disappeared (FIG. 6b), but the value of magnetic entropy change was dramatically reduced (FIG. 6c), the peak value was only 8.0 J/kgK, less than ⅓ of entropy change value of the bulk material and the powder sample with a particle size in the range of 15~120 µm.

Example 2

First-Order Phase-Transition Magnetocaloric Material $La_{0.7}(Ce,Pr,Nd)_{0.3}(Fe_{0.98}Co_{0.02})_{11.6}Si_{1.4}$ Showing Small Hysteresis Loss 1) The materials were prepared in accordance with the chemical formula $La_{0.7}(Ce,Pr,Nd)_{0.3}(Fe_{0.98}Co_{0.02})_{11.6}Si_{1.4}$. The raw materials included La—Ce—Pr—Nd mischmetal, Fe, Si, La and Co, wherein elementary La was added to make up the La insufficiency in the La—Ce—Pr—Nd mischmetal.

2) The raw materials prepared in step 1), after mixed, was loaded into an arc furnace. The arc furnace was vacuumized to a pressure of $2 \times 10^{-3}$ Pa, washed with high-purity argon with a purity of 99.996% twice, and then filled with high-purity argon with a purity of 99.996% to a pressure of 1 atm. The arc was struck (the raw materials were smelted together to form alloy after striking) to generate alloy ingot. Each alloy ingot was smelted at a temperature of 2000° C. repeatedly for 4 times. After the smelting, ingot alloys were obtained by cooling down in a copper crucible.

3) After wrapped separately with molybdenum foil and sealed in a vacuumized quartz tube ($1 \times 10^{-4}$ Pa), the ingot alloys obtained from step 2) were annealed at 1080° C. for 30 days followed by being quenched in liquid nitrogen by breaking the quartz tube. As a result, samples $La_{0.7}(Ce,Pr,Nd)_{0.3}(Fe_{0.98}Co_{0.02})_{11.6}Si_{1.4}$ having a $NaZn_{13}$-type structure were obtained.

4) The material obtained in step 3) was crushed and cut into crude granules with a particle size of less than 1 mm. The crude granules were further grinded into irregular powder with a particle size ≤200 µm in an agate mortar under the protection of acetone. The resultant metal powder was then screened through standard sieves with different mesh number so as to collect the powder with particle sizes within different ranges. To prevent oxidation, the screening process was conducted under the protection of acetone liquid. The detailed screening modes are shown as follows:

Powder sample with a particle size in the range of 150~200 µm was obtained by screening through 110-mesh and 80-mesh standard sieves;

Powder sample with a particle size in the range of 15~50 μm was obtained by screening through 800-mesh and 270-mesh standard sieves.

Sample Test and Result Analysis

Figure 7:
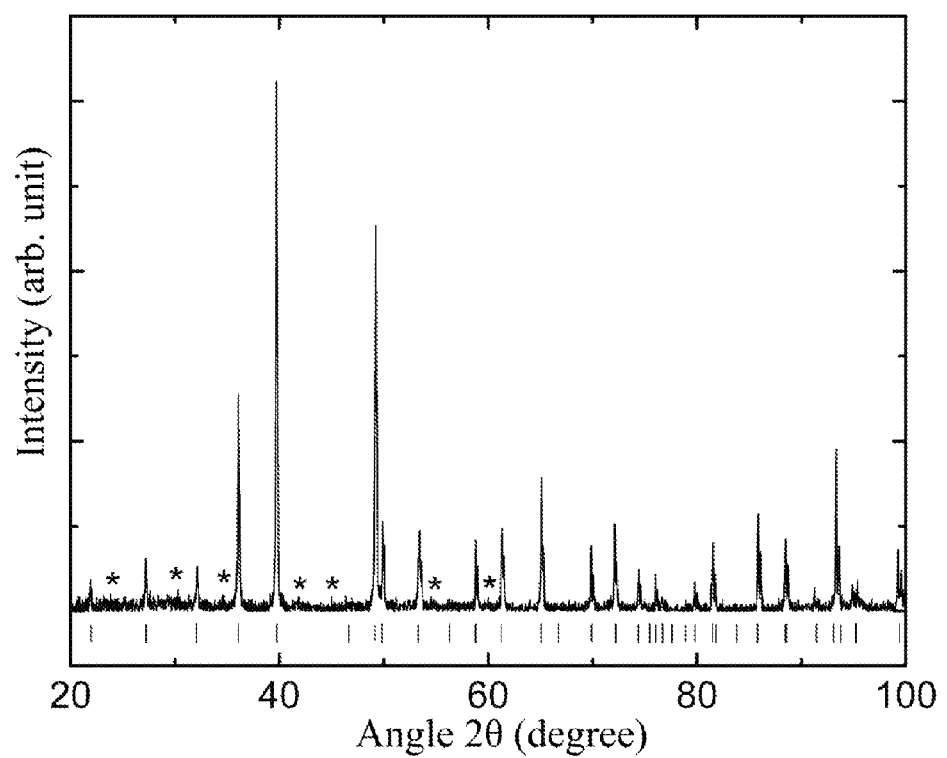
FIG. 7 shows the room temperature X-ray diffraction (XRD) spectrum of samples $La_{0.7}(Ce,Pr,Nd)_{0.3}(Fe_{0.98}Co_{0.02})_{11.6}Si_{1.4}$ prepared in Example 2.

I. The X-ray diffraction (XRD) spectrum of the samples $La_{0.7}(Ce,Pr,Nd)_{0.3}(Fe_{0.98}Co_{0.02})_{11.6}Si_{1.4}$ at room temperature was measured using the Cu-target X-ray diffractometer. The result, as shown in FIG. 7, indicated that this sample had a main phase with a $NaZn_{13}$-type structure and a small amount of unknown impurity phases (labeled with *) was present, which may be caused by the low purity of the raw materials. However, the presence of impurities in the low-purity raw materials had no impact on the formation of the $NaZn_{13}$-type main phase.

Figure 8:
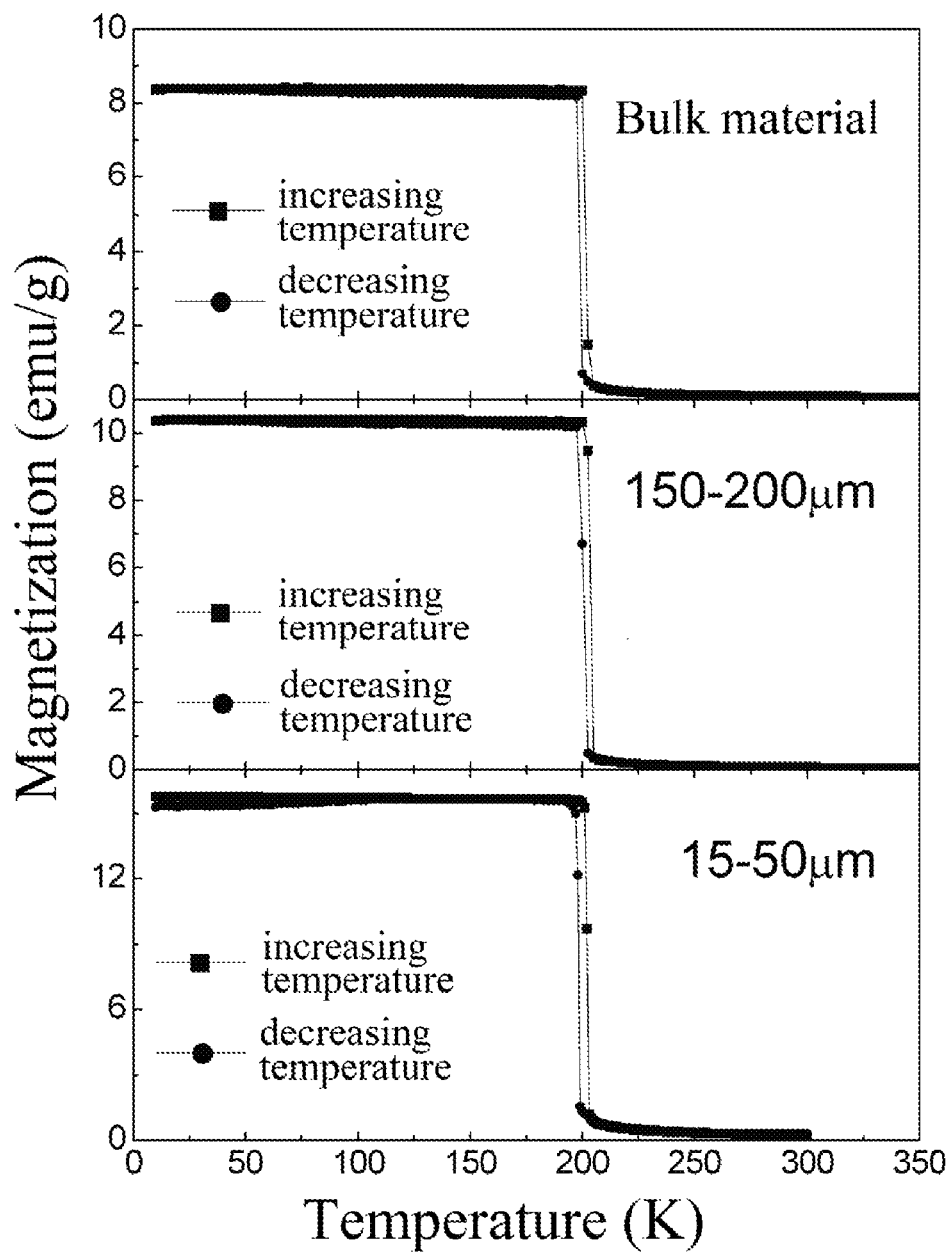
FIG. 8 shows the thermomagnetic (M-T) curves of $La_{0.7}(Ce,Pr,Nd)_{0.3}(Fe_{0.98}Co_{0.02})_{11.6}Si_{1.4}$ measured in a magnetic field of 0.02 T for bulk material and samples with a particle size within 2 ranges (150~200 μm, 15~50 μm) prepared in Example 2.

II. The thermomagnetic curves (M-T) of $La_{0.7}(Ce,Pr,Nd)_{0.3}(Fe_{0.98}Co_{0.02})_{11.6}Si_{1.4}$ bulk material (single granule, weight: 4.6 mg) and samples with particle sizes within various ranges (150~200 μm (weight: 2.47 mg), 15~50 μm (weight: 1.95 mg)) were measured in a magnetic field of 0.02 T, using the Superconducting Quantum Interference Vibrating Sample Magnetometer 【MPMS(SQUID)VSM】, as shown in FIG. 8. The result showed that the Curie temperatures of samples with particle size within the two ranges were 200K, same as that of the bulk material.

Figure 9:
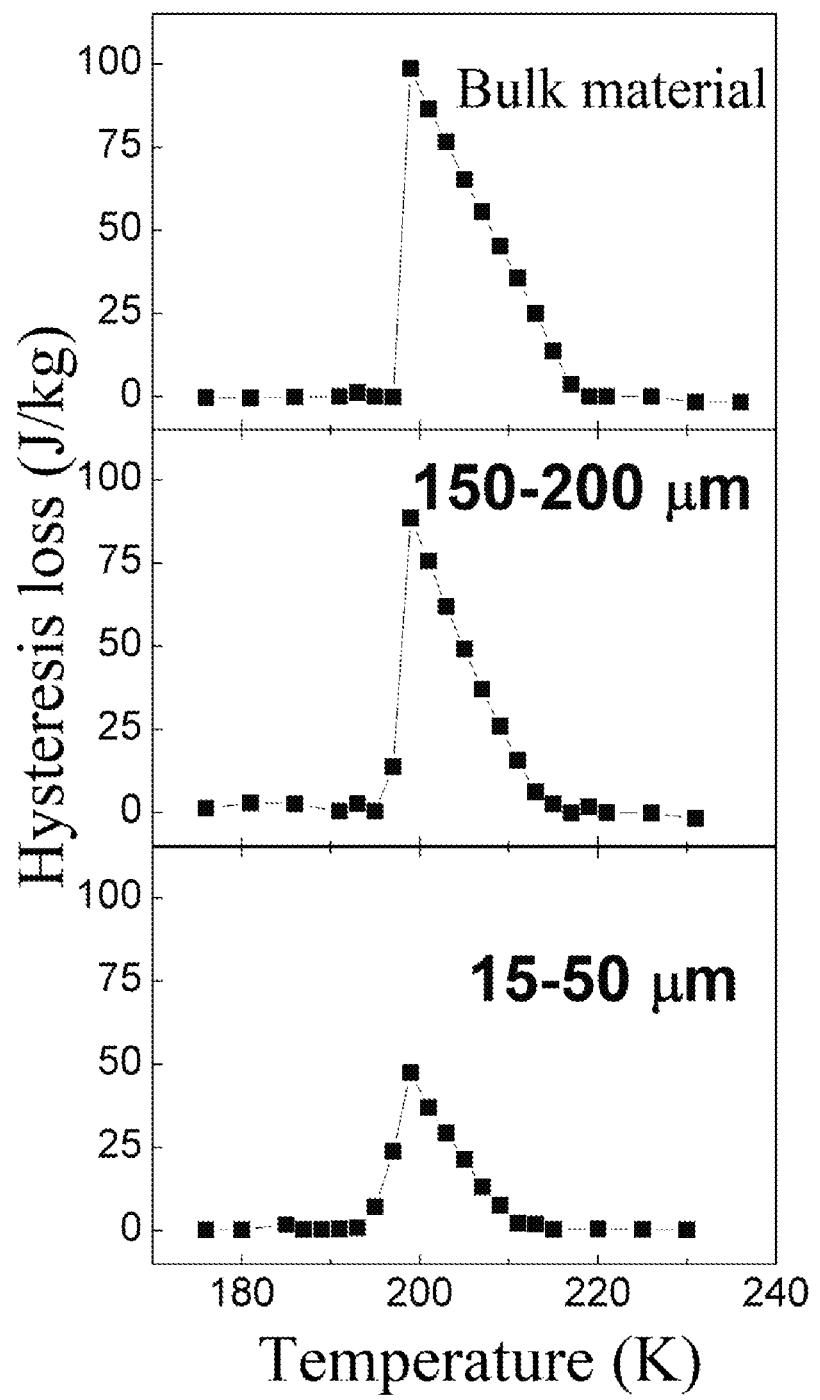
FIG. 9 indicates the dependency of the hysteresis loss on temperature for $La_{0.7}(Ce,Pr,Nd)_{0.3}(Fe_{0.98}Co_{0.02})_{11.6}Si_{1.4}$ bulk material and samples with a particle size within 2 ranges (150~200 μm, 15~50 μm) prepared in Example 2.

III. The magnetization curves (M-H curves) of $La_{0.7}(Ce,Pr,Nd)_{0.3}(Fe_{0.98}Co_{0.02})_{11.6}Si_{1.4}$ bulk material (single granule, weight: 4.6 mg) and samples with particle sizes within various ranges (150~200 μm (weight: 2.47 mg), 15~50 μm (weight: 1.95 mg)) were measured on the MPMS (SQUID) VSM at different temperatures in the process of increasing and decreasing field. The rates of increasing and decreasing field were the same, both 500 Oe/second. FIG. 9 shows the dependency of the hysteresis loss of the bulk material and samples with particle sizes within the two ranges on temperature. Through the comparison of all the curves, it can be observed that hysteresis loss was greatly reduced as the particle size was decreased; maximal magnetic hysteresis was reduced from 98.6 J/kg (for the bulk material) to 47.5 J/kg (for particle size in the range of 15~50 μm), and the reduction rate was up to 52%. The M-H curve is a straight line in the high temperature zone (1:13-phase paramagnetic zone), which indirectly demonstrates that both the bulk material and the samples with particle sizes within the two ranges are pure 1:13-phase and almost no a-Fe-phase was present.

Figure 10:
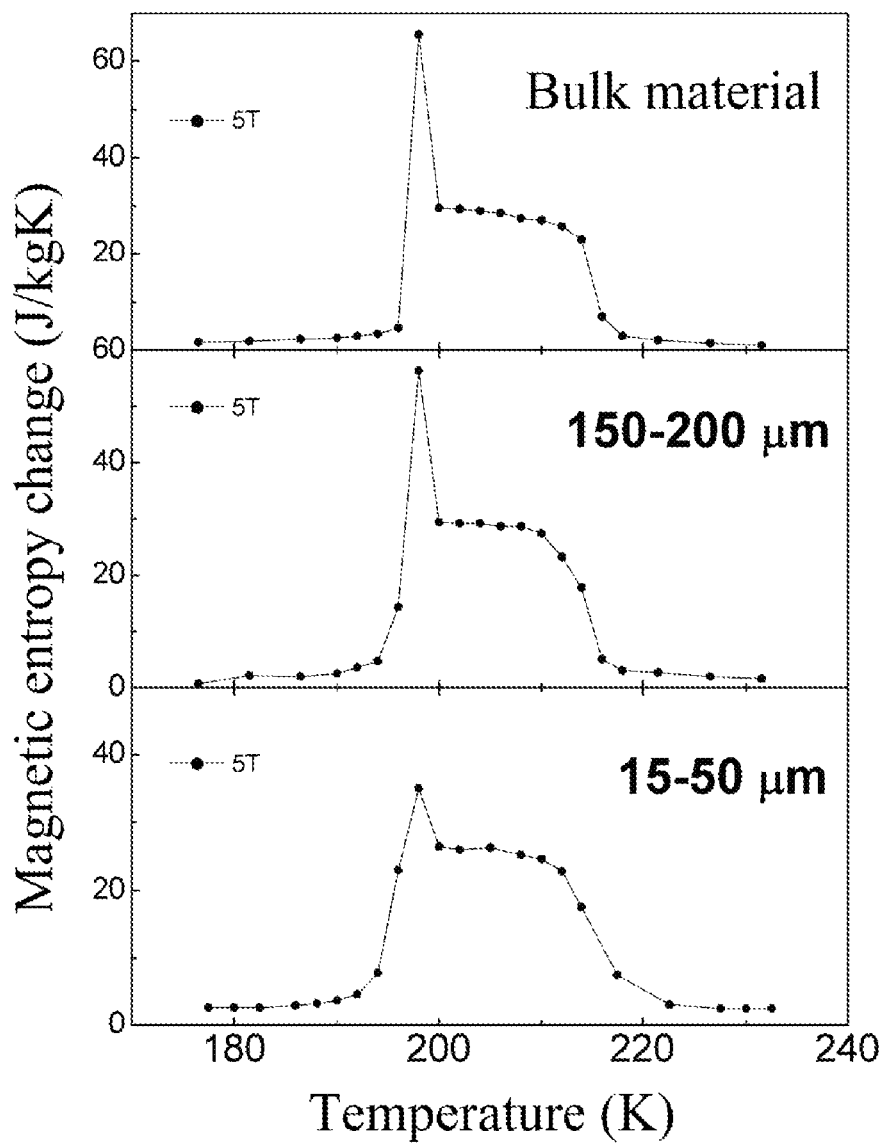
FIG. 10 indicates the dependency of the ΔS on temperature in the process of increasing the field under a magnetic field of 5 T for $La_{0.7}(Ce,Pr,Nd)_{0.3}(Fe_{0.98}Co_{0.02})_{11.6}Si_{1.4}$ bulk material and samples with a particle size within 2 ranges (150~200 μm, 15~50 μm) prepared in Example 2.

IV. On the basis of the Maxwell's equation $$\Delta S(T, H) = S(T, H) - S(T, 0) = \int_0^H \left(\frac{\partial M}{\partial T}\right)_H dH,$$

the magnetic entropy change, $\Delta S$, can be calculated according to the isothermal magnetization curve. FIG. 10 shows the dependency of $\Delta S$ on temperature for $La_{0.7}(Ce,Pr,Nd)_{0.3}(Fe_{0.98}Co_{0.02})_{11.6}Si_{1.4}$ bulk material and samples with particle sizes within the two ranges in the process of increasing field in a magnetic field of 5 T. From FIG. 10, it was observed that the $\Delta S$ peak shape extended asymmetrically towards the high-temperature zone while the field was increased; a sharp peak was followed by a plateau, which is a typical feature of a $La(Fe,Si)_{13}$-based first-order phase transition system and caused by the metamagnetic transition behavior induced by the magnetic field at a temperature higher than the Curie temperature. Such a $\Delta S$ peak shape further confirmed the existence of the first-order phase-transition property and metamagnetic behavior of the system. It has been demonstrated by some studies that the appearance of a sharp $\Delta S$ peak is caused by the coexistence of two phases during the first-order phase transition and is a false signal which does not involving thermal effect; but the followes $\Delta S$ plateau reflects the real property of magneto caloric effect. From above, it can be found that both $La_{0.7}(Ce,Pr,Nd)_{0.3}(Fe_{0.98}Co_{0.02})_{11.6}Si_{1.4}$ bulk material and samples with particle sizes within the two ranges maintained great effective magnetic entropy change range, i.e. an average value of 27.5 J/kgK, whereas hysteresis loss was reduced dramatically.

Example 3

Figure 11:
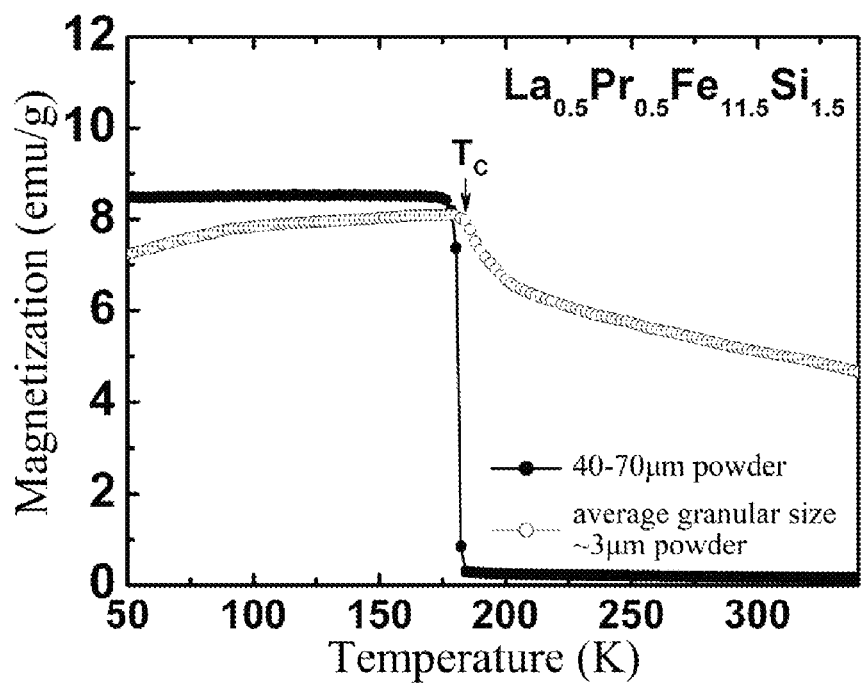
FIG. 11 shows the thermomagnetic (M-T) curves of two powder samples $La_{0.5}Pr_{0.5}Fe_{11.5}Si_{1.5}$ with a particle size of 40-70 μm and with an average particle size of about 3 μm prepared in Example 3, in a magnetic field of 0.02 T.

First-Order Phase-Transition Magnetocaloric Material $La_{0.5}Pr_{0.5}Fe_{11.5}Si_{1.5}$ Showing Small Hysteresis Loss $La_{0.5}Pr_{0.5}Fe_{11.5}Si_{1.5}$ alloy having a $NaZn_{13}$-type structure was made through a process similar to that described in Example 1, from elementary La, Pr, Fe and Si, as the raw materials. The obtained alloy was crushed, grinded and screened, then a granule sample with a particle size in the range of 40~70 μm and a powder sample with a particle size of less than 10 μm were collected. The powder sample with a particle size of less than 10 μm was further grinded, so as to generate a super fine powder sample with an average particle size of about 3 μm. FIG. 11 shows the M-T curves of the two samples i.e. the granules (40~70 μm) and the super fine powder with an average particle size of about 3 μm. It was found that the Curie temperature of the powder sample (40~70 μm) was 181K, same as that of the bulk material; and the Curie temperature of the sample with an average particle size of about 3 μm was 185K, 4K higher than that of the bulk material. Moreover, magnetization was still high in the high temperature zone and failed to be reduced to zero even at up to 390K. Similar to Example 1, the above result indicates that the stability of the material was lost. The M-H curves demonstrate that the maximal hysteresis loss was about 91 J/kg for $La_{0.5}Pr_{0.5}Fe_{11.5}Si_{1.5}$ bulk material and 45 J/kg for the powder (40~70 μm); the reduction rate was about 51%; and the magnitude of magnetic entropy change was maintained essentially same. The hysteresis loss of the sample with an average particle size of about 3 μm was almost reduced to zone; whereas the magnitude of magnetic entropy change was decreased dramatically.

Example 4

Figure 12:
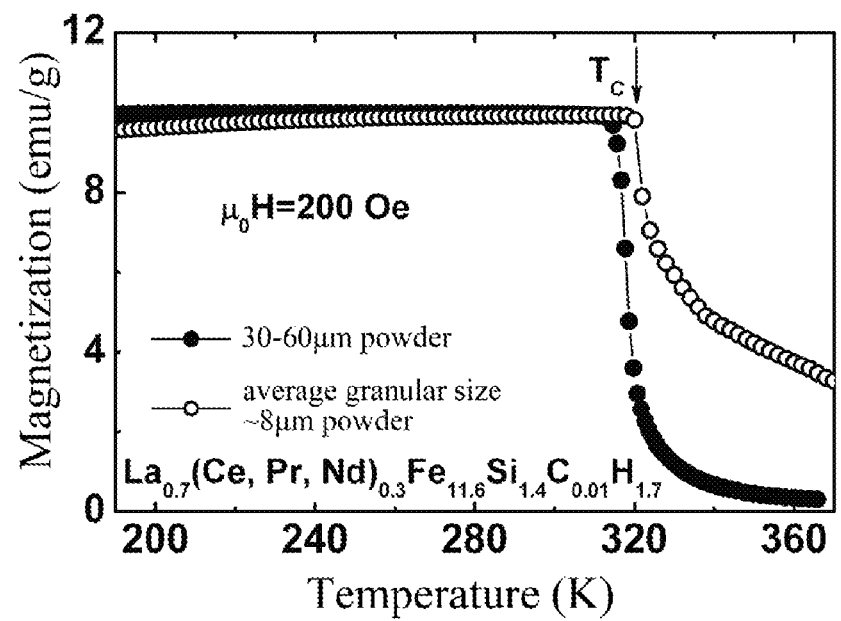
FIG. 12 shows the thermomagnetic (M-T) curves of two powder samples $La_{0.7}(Ce, Pr, Nd)_{0.3}Fe_{11.6}Si_{1.4}C_{0.01}H_{1.7}$ with a particle size of 30-60 μm and with an average particle size of about 8 μm prepared in Example 4, in a magnetic field of 0.02 T.

First-Order Phase-Transition Magnetocaloric Material $La_{0.7}(Ce,Pr,Nd)_{0.3}Fe_{11.6}Si_{1.4}C_{0.01}H_{1.7}$ Showing Small Hysteresis Loss $La_{0.7}(Ce, Pr, Nd)_{0.3}Fe_{11.6}Si_{1.4}C_{0.01}$ alloy having a $NaZn_{13}$-type structure was made through a process similar to that described in Example 1, from industrial-pure mischmetal La—Ce—Pr—Nd, elementary La, Fe and Si as well as FeC alloy (for providing C element), as the raw materials. The sample was broken, and annealed in hydrogen gas, so as to generate $La_{0.7}(Ce, Pr, Nd)_{0.3}Fe_{11.6}Si_{1.4}C_{0.01}H_{1.7}$. Then the obtained alloy was crushed, grinded and screened, then $La_{0.7}(Ce, Pr, Nd)_{0.3}Fe_{11.6}Si_{1.4}C_{0.01}H_{1.7}$ powder samples with particle sizes in the range of 30~60 μm and less than 10 μm (average particle size was about 8 μm) were collected. FIG. 12 shows the M-T curves of the granule sample (30~60 μm) and the powder sample with an average particle size of about 8 µm. It was found that the Curie temperature of the powder sample (30~60 µm) was 318K, same as that of the bulk material; and the Curie temperature of the powder sample with an average particle size of about 8 µm was 321K, 3K higher than that of the bulk material. Moreover, magnetization was relatively higher in the high temperature zone far above the Curie temperature. Similar to Example 1, the above result indicates that the stability of the material was lost. The M-H curves demonstrate that the maximal hysteresis loss was about 40 J/kg for $La_{0.7}(Ce, Pr, Nd)_{0.3}Fe_{11.6}Si_{1.4}C_{0.01}H_{1.7}$ bulk material and 18 J/kg for the granules (30~60 µm); the reduction rate was about 55%; and the magnitude of magnetic entropy change was maintained essentially same. The hysteresis loss of the powder sample with an average particle size of about 8 µm was almost reduced to zone; whereas the magnitude of magnetic entropy change was decreased dramatic ally.

Example 5

Figure 13:
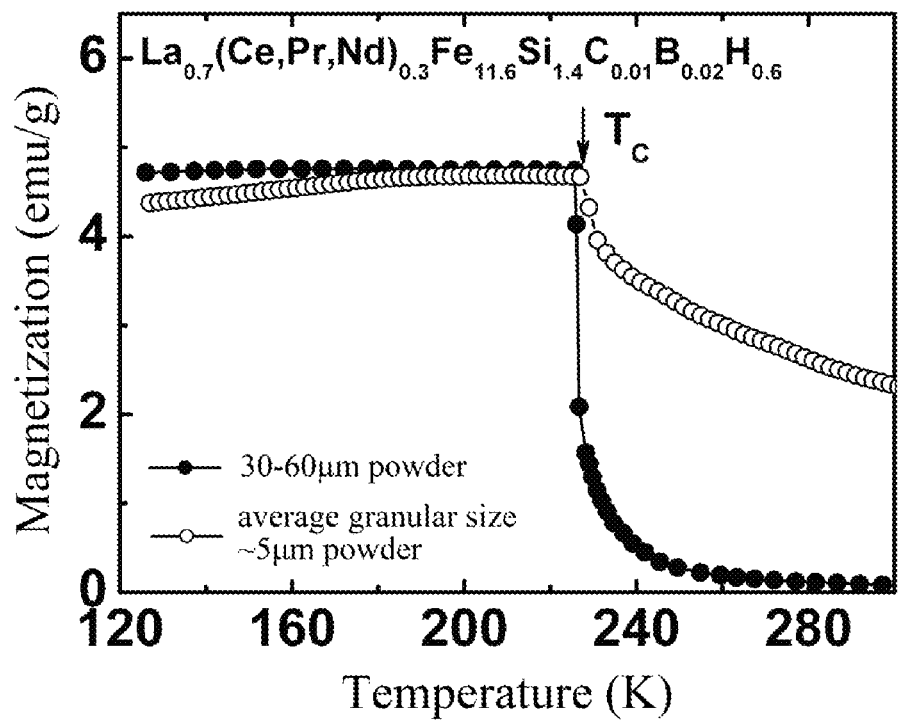
FIG. 13 shows the thermomagnetic (M-T) curves of two powder samples $La_{0.7}(Ce,Pr,Nd)_{0.3}Fe_{11.6}Si_{1.4}C_{0.01}B_{0.02}H_{0.6}$ with a particle size of 30-60 μm and with an average particle size of about 5 μm prepared in Example 5, in a magnetic field of 0.02 T.

First-Order Phase-Transition Magnetocaloric Material $La_{0.7}(Ce, Pr, Nd)_{0.3}Fe_{11.6}Si_{1.4}C_{0.01}B_{0.02}H_{0.6}$ Showing Small Hysteresis Loss $La_{0.7}(Ce,Pr,Nd)_{0.3}Fe_{11.6}Si_{1.4}C_{0.01}B_{0.02}$ alloy having a $NaZn_{13}$-type structure was made through a process similar to that described in Example 1, from industrial-pure mischmetal La—Ce—Pr—Nd, elementary La, Fe and Si, FeC alloy (for providing C element) as well as FeB alloy (for providing C element), as the raw materials. The sample was broken, and annealed in hydrogen gas, so as to generate $La_{0.7}(Ce,Pr,Nd)_{0.3}Fe_{11.6}Si_{1.4}C_{0.01}B_{0.02}H_{0.6}$. Then the obtained alloy was crushed, grinded and screened, then $La_{0.7}(Ce,Pr,Nd)_{0.3}Fe_{11.6}Si_{1.4}C_{0.01}B_{0.02}H_{0.6}$ powder samples with particle sizes in the range of 30~60 µm and less than 10 µm were collected. The powder sample with a particle size less than 10 µm was further grinded, so as to generate a super fine powder sample with an average particle size of about 5 µm. FIG. 13 shows the M-T curves of the materials with the two particle sizes. It was found that the Curie temperature of the powder sample (30~60 µm) was 226K, same as that of the bulk material; and the Curie temperature of the sample with an average particle size of about 5 µm was 229K, 3K higher than that of the bulk material. Moreover, magnetization was relatively higher in the high temperature zone far above the Curie temperature. Similar to Example 1, the above result indicates that the stability of the materials was lost. The M-H curves demonstrate that the maximal hysteresis loss was about 160 J/kg for $La_{0.7}(Ce,Pr,Nd)_{0.3}Fe_{11.6}Si_{1.4}C_{0.01}B_{0.02}H_{0.6}$ bulk material and was reduced to 67 J/kg for the powder sample (30~60 µm); the reduction rate was about 58%; and the magnitude of magnetic entropy change was maintained essentially same. The hysteresis loss of the powder sample with an average particle size of about 5 µm was almost reduced to zone; whereas the magnitude of magnetic entropy change was decreased dramatically.

Example 6

Figure 14:
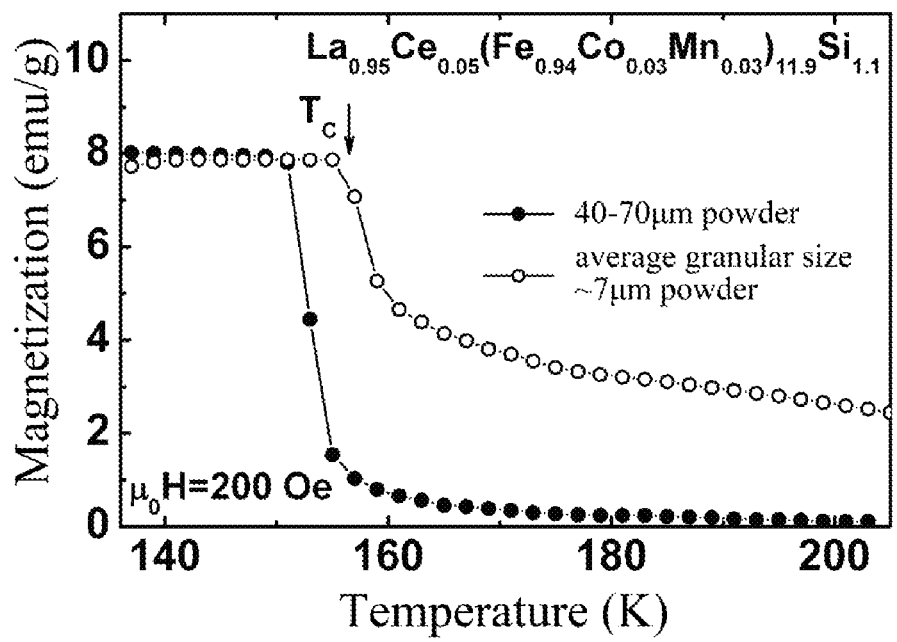
FIG. 14 shows the thermomagnetic (M-T) curves of two powder samples $La_{0.95}Ce_{0.05}(Fe_{0.94}Co_{0.03}Mn_{0.03})_{11.9}Si_{1.1}$ with a particle size of 40-70 μm and with an average particle size of about 7 μm prepared in Example 6, in a magnetic field of 0.02 T.

First-Order Phase-Transition Magnetocaloric Material $La_{0.95}Ce_{0.05}(Fe_{0.94}Co_{0.03}Mn_{0.03})_{11.9}Si_{1.1}$ Showing Small Hysteresis Loss $La_{0.95}Ce_{0.05}(Fe_{0.94}Co_{0.03}Mn_{0.03})_{11.9}Si_{1.1}$ powder samples with a particle size in the range of 40~70 µm and with an average particle size of about 7 µm were made through a process similar to that described in Example 1, from industrial-pure FeC alloy (for providing C element), elementary La, Fe, Si, Co and Mn, as the raw materials. FIG. 14 shows the M-T curves of the materials with the two particle sizes. It was found that the Curie temperature of the granule sample (40~70 µm) was ~153K, same as that of the bulk material; and the Curie temperature of the sample with an average particle size of about 7 µm was 156K, 3K higher than that of the bulk material. Moreover, magnetization was relatively higher in the high temperature zone far above the Curie temperature. Similar to Example 1, the above result indicates that the stability of the materials was lost. The M-H curves demonstrate that the maximal hysteresis loss was about 32 J/kg for $La_{0.95}Ce_{0.05}(Fe_{0.94}Co_{0.03}Mn_{0.03})_{11.9}Si_{1.1}$ bulk material and 16 J/kg for the powder sample (40~70 µm); the reduction rate was about 50%; and the range of magnetic entropy change was maintained essentially same. The hysteresis loss of the sample with an average particle size of about 7 µm was almost reduced to zone; whereas the range of magnetic entropy change was decreased dramatically.

Example 7

First-Order Phase-Transition Magnetocaloric Material $La_{0.7}(Ce, Pr, Nd)_{0.3}(Fe_{0.96}Co_{0.04})_{11.6}Si_{1.4}$ Showing Small Hysteresis Loss A $La_{0.7}(Ce, Pr, Nd)_{0.3}(Fe_{0.96}Co_{0.04})_{11.6}Si_{1.4}$ granule sample with a particle size in the range of 30~60 µm was made through a process similar to that described in Example 1, from industrial-pure mischmetal La—Ce—Pr—Nd (for providing Ce element), elementary La, Fe, Si and Co, as the raw materials. The magnetic result demonstrates that the granule sample has the Curie temperature of 223K and magnetic entropy change value of about 24 J/kgK, both same as those of the bulk material. The maximal hysteresis was about 24 J/kg for the bulk material and was reduced to about 10 J/kg for the granule sample with a particle size in the range of 30~60 µm; the reduction rate was about 58%.

In summary, while the particle size of a $La(Fe,Si)_{13}$-based magnetocaloric material was decreased within the range of 15-120 µm, the materials still maintained a great magnetic entropy change value and the hysteresis loss can be effectively reduced during the process of first-order phase-transition, which plays an important role in the improvement of working efficiency of magnetic refrigeration cycle in practical application. While the particle size was further decreased to 10 µm or less, the stability of the sample was lost; metamagnetic transition behavior was weakened; and the magnitude of magnetic entropy change was reduced dramatically. As a result, this material is no longer suitable for the magnetic refrigeration application. Therefore, the giant magnetocaloric effect of the material can be maintained to the max if the granules with a particle size of less than 10 µm are removed by screening.

The invention claimed is:
1. A first-order phase-transition $La(Fe,Si)_{13}$-based magnetocaloric material showing small hysteresis loss, wherein the magnetocaloric material has a $NaZn_{13}$-type structure and is composed of granules with a particle size being in the range of 15~50 µm and of not less than 15 µm, and
wherein the magnetocaloric material is represented by the following chemical formula:

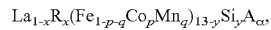

wherein
R is one or more selected from elements cerium (Ce), praseodymium (Pr) and neodymium (Nd),
A is one or more selected from elements carbon (C), hydrogen (H) and boron (B),
x is in the range of $0<x\leq 0.5$,
y is in the range of $0.8<y\leq 1.6$,
p is in the range of $0<p\leq 0.2$,
q is in the range of $0\leq q\leq 0.2$,
α is in the range of $0\leq \alpha \leq 3.0$.

2. The magnetocaloric material according to claim 1, wherein when the particle size is reduced to 10 μm or less, the stability of the magnetocaloric material is lost; metamagnetic transition behavior is weakened; the magnitude of magnetic entropy change is reduced dramatically; and thus it is no longer suitable for the practical application in magnetic refrigeration technology, therefore, the giant magnetocaloric effect of the material can be maintained to the max if the granules with a particle size of less than 10 μm are removed by screening.

3. The magnetocaloric material according to claim 1, wherein the magnetocaloric material is represented by the following chemical formula:

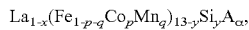

$La_{1-x}(Fe_{1-p-q}Co_p Mn_q)_{13-y}Si_y A_\alpha$, wherein
R is one or more selected from elements cerium (Ce), praseodymium (Pr) and neodymium (Nd),
A is one or more selected from elements carbon (C), hydrogen (H) and boron (B),
x is in the range of $0<x\leq 0.5$,
y is in the range of $0.8<y\leq 1.6$,
p is in the range of $0<p\leq 0.2$,
q is in the range of $0<q\leq 0.2$,
α is in the range of $0\leq \alpha \leq 3.0$.

4. The magnetocaloric material according to claim 1, wherein the magnetocaloric material is represented by the following chemical formula:

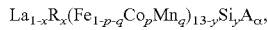

$La_{1-x}R_x(Fe_{1-p-q}Co_p Mn_q)_{13-y}Si_y A_\alpha$, wherein
R is one or more selected from elements Ce, Pr and Nd,
A is one or more selected from elements C, H and B,
x is in the range of $0<x\leq 0.5$,
y is in the range of $1.0\leq y\leq 1.6$,
p is in the range of $0<p\leq 0.05$,
q is in the range of $0\leq q\leq 0.03$,
α is in the range of $0\leq \alpha \leq 1.8$.

5. A method for preparing a magnetocaloric material according to claim 1, comprising the steps of
 1) formulating raw materials other than hydrogen according to the chemical formula;
 2) placing the raw materials formulated in step 1) in an arc furnace, vacuuming and washing it with argon gas, and smelting the raw materials under the protection of argon gas so as to obtain alloy ingots;
 3) vacuum annealing the alloy ingots obtained in step 2) and then quenching the alloy ingots in liquid nitrogen or water so as to obtain a magnetocaloric material $La_{1-x}R_x(Fe_{1-p-q}Co_p Mn_q)_{13-y}Si_y A_\alpha$ having a $NaZn_{13}$-type structure;
 4) crushing, grinding and screening the magnetocaloric material obtained in step 3) so as to obtain granules with a particle size of 15~50 μm;
 wherein, when A in the chemical formula includes element hydrogen, the method further comprises the step of 5) annealing the granules obtained in step 4) in hydrogen, or annealing the magnetocaloric material obtained in step 3) in hydrogen after being roughly crushed, and then carrying out step 4).

6. The method according to claim 5, wherein, in the step 4), granules with a particle size of less than 15 μm, particularly less than 10 μm are removed by screening.

7. The method according to claim 5, wherein, the raw materials La and R are commercially available elementary rare earth elements and/or industrial-pure LaCe alloy and/or industrial-pure LaCePrNd mischmetal; preferably, when A includes element carbon, the carbon is provided by FeC alloy.

8. A magnetic refrigerator, comprising a magnetocaloric material according to claim 1.

9. The process of using a magnetocaloric material according to claim 1 in the manufacture of a refrigeration material.

10. A magnetic refrigerator, comprising a magnetocaloric material prepared by a method according to claim 5.

11. The process of using a magnetocaloric material prepared by a method according to claim 5 in the manufacture of a refrigeration material.

* * * * *